Jan. 4, 1949.  F. H. HIBBARD  2,457,892
PULSE TESTING EQUIPMENT
Filed June 26, 1943
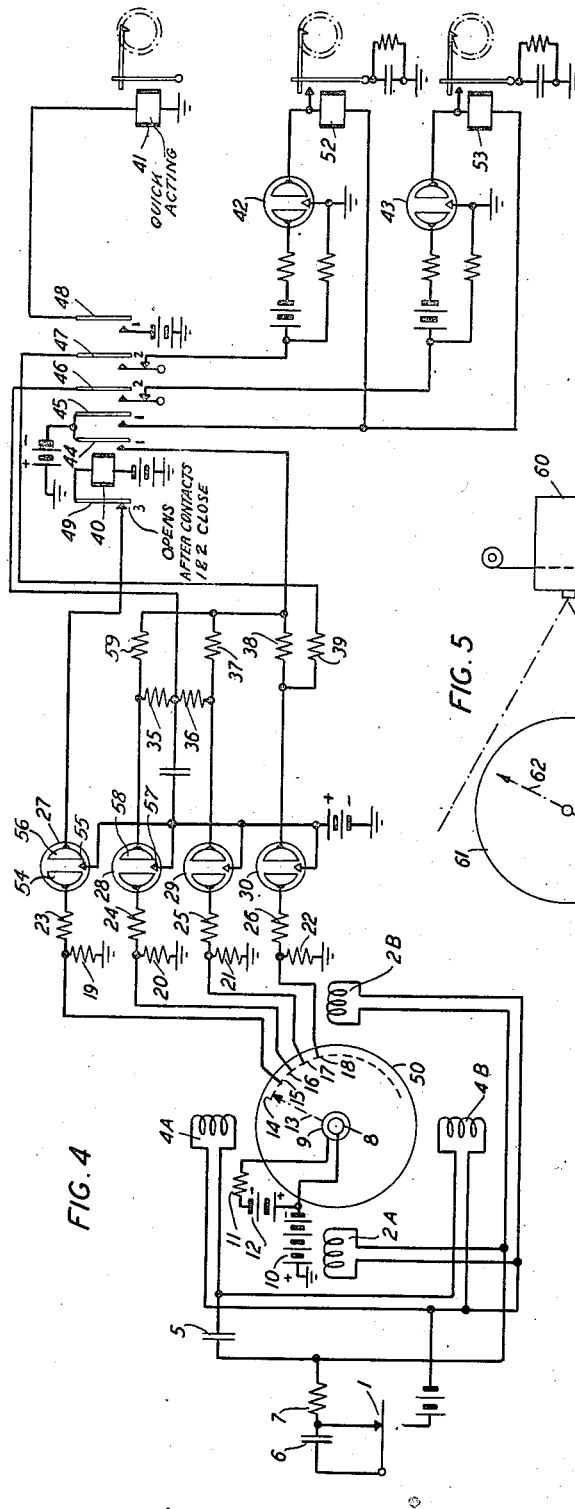
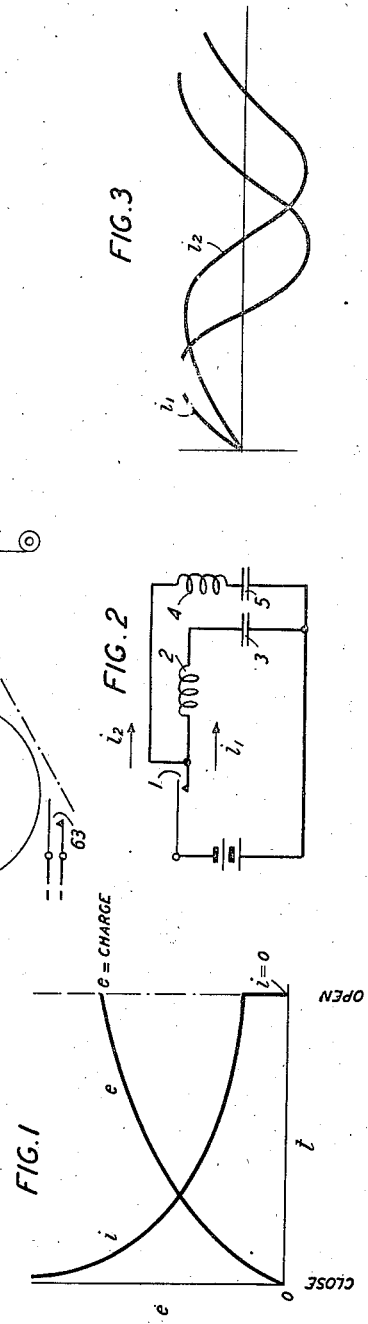
INVENTOR
F. H. HIBBARD
BY P. C. Smith
ATTORNEY Patented Jan. 4, 1949

2,457,892

UNITED STATES PATENT OFFICE 2,457,892

PULSE TESTING EQUIPMENT

Frank H. Hibbard, Mountain Lakes, N. J., assignor to Bell Telephone Laboratories, Incorporated, New York, N. Y., a corporation of New York Application June 26, 1943, Serial No. 492,472

10 Claims. (Cl. 179—175.2)

This invention relates to testing equipment and has for its object to provide a very rapid, accurate indicating means for use with such equipment.

In designing a device for generating pulses, such as a dial for use in a commercial circuit, it is necessary to determine the maximum and minimum values of the individaul pulse make and break which the device will produce under all variations of manufacture and use. Hence it is essential to the design of pulse generating devices and circuits to provide convenient means for testing individual pulse time values.

One well-known method for observing the make-and-break operations of a pulsing device is by the use of an oscillograph, but this method is not suitable for adjustment and maintenance because of the quantity of paper tape required and the time and labor of making readings from the tape.

A classic method of measuring the length of a circuit closure is by the charge produced on a condenser during such closure. However, the known methods of measuring or "reading" the condenser charge by the observation of ballistic galvanometer displacement, or by balancing the condenser charge voltage against a potentiometer voltage are not sufficiently rapid for the successive reading of individual pulses in a train of ten pulses occurring within a time of approximately one second, such as are used in commercial circuits.

In the present invention means is provided for indicating instantaneously the occurrence of preset maximum or minimum values of condenser charge resulting from circuit closure, rapid enough so that a single condenser can be "read" to limits, discharged, and presented to the pulse generating device in time for testing the next succeeding closure. By the usual methods of relay switching a second condenser may be similarly charged, read, and restored, to test for the open-circuit time values of successive pulses of the generating device. Thus the individual pulse values of "make" and "break" are continuously tested within maximum and minimum limits.

These advantages are obtained by the concurrent method of measuring the charge voltage of the condenser disclosed in the invention. In the previously known methods of determining condenser charge voltage corresponding to circuit closure time, the measurement of condenser voltage remaining as a stored charge takes place after the time interval has elapsed and the circuit opened. In the present invention, the final charge of a condenser is determined by connecting in series with the condenser the actuating coils of a low-inertia device such as an electron beam. The electron beam thus responds to the charging current of the condenser. Since the charging current is related by natural law to the charge voltage at every instant, the position of the electron beam is at every instant a measure of the condenser charge voltage, and hence of previously elapsed time of charge. Hence the underlying idea of this invention is the direct conversion of condenser charging current into physical displacement by electromagnetic means. An advantage of this invention in continuous testing is that the condenser voltage is already converted to a physical displacement which can be evaluated immediately and the speed of reading is greatly increased over the galvanometer or balance methods which require conversion of condenser charging current into physical displacement by electromagnetic means. A further advantage of this invention is that the same circuit which charges the condenser also actuates the indicator, thus reducing switching operations and the uncertainties of mechanical electrical contacts in the reading of quantitative values. Another advantage of this invention is that the condenser is not required to store a charge for any period after the charging circuit is open, and the results are less directly affected by condenser leakage.

More specifically, the circuits including the two beam-displacing coils of the electron tube are so tuned that the out-of-phase currents generated therein by the closure of the charging circuit cause the electron beam to rotate through an angle which is a measure of the time of the closure.

A series of electrodes are mounted in the rotating path of the electron beam and certain of these electrodes are connected to other gas-filled tubes so that as the electron beam strikes an electrode the associated tube becomes conducting. Preferably four tubes would be employed, viz., one attached at a point reached by the beam immediately following the start of the pulse closure, one attached at a point just ahead of that reached by the beam in response to the minimum acceptable closure, one at a point just beyond that reached by the beam in response to the maximum acceptable closure and the fourth at an intermediate point. Means is provided operable in the open-circuit interval of the pulse to determine which gas-filled tubes have been operated and to discharge them.

By the use of a second rotating beam tube and gas-filled tubes attached to suitable electrodes, associated with the back contact of a relay connected to the pulse generator, the same relations are established with the open-circuit intervals of the pulse, since the back contact of the relay closes as the pulse generator opens.

A clearer understanding of the invention will be obtained from a consideration of the following description in connection with the drawing, in which:

Fig. 1 is a graphic showing of the characteristic change of voltage and current with time in charging a condenser;

Fig. 2 is a schematic showing of the basic circuit of the invention;

Fig. 3 is a diagrammatic showing of the out-of-phase currents resulting from closing the contact in the circuit of Fig. 2 and used to produce a rotating magnetic field for the rotational displacement of an electron beam;

Fig. 4 is a more detailed showing of the pulse measuring arrangement together with the preferred indicating and recording means; and Fig. 5 is an alternative recording means.

A rotating beam electron tube of the type to be used in the present invention is described and claimed in U. S. Patent No. 2,217,774, granted October 15, 1940 to A. M. Skellett. In this type of tube the flow of electrons from a central cathode is concentrated by a magnetic field, external to the tube, to form a double-ended beam. This beam can be caused to rotate, stop or disappear by manipulation of the external magnetic field. Rotation is obtained by the use of the familiar rotating magnetic field method in which two or more out-of-phase currents flow to separate coils disposed about the circular field space at suitable angles. In the present invention two such coils 2 and 4 are connected in series with two condensers 3 and 5, respectively, as shown in the schematic diagram of Fig. 2.

The condensers 3 and 5 are so chosen that in combination with coils 2 and 4, respectively, one branch is tuned to a frequency below the desired speed of rotation for the electron beam while the other branch is tuned to a frequency above this speed. With the closure of contact 1 a charging circuit is closed for condensers 3 and 5 in the two branches. The charging currents, as indicated in Fig. 1, take the form of a portion of an oscillatory current, but due to the difference of the tuning of the two branches, soon reach an out-of-phase relation, simulating two-phase currents. Thus, for a duration of about one oscillatory cycle, the magnetic field system of the tube is energized with a two-phase current supply similar to that shown in Fig. 3. Since the field coils of the tube are arranged with their axes at 90 degrees to each other, they produce a resultant field rotating in space. The beam of the tube thus experiences at least one cycle of rotating magnetic field, and makes one 360-degree revolution within the tube during this cycle.

Referring to the more detailed showing of Fig. 4, pulsing spring 1 may be taken to represent either the pulse generating contact itself or a contact controlled thereby which follows faithfully the pulsations of the primary pulse generator. The beam displacing coils of tube 50 are arranged in parallel branches with coils 2A and 2B in one branch and coils 4A and 4B in the other branch, condenser 5 being included in the branch with coils 4A and 4B. Condenser 6 and resistance 7 are connected in series with the pulsing contact and battery and are selected with such values that the transient currents in the coils of tube 50 will produce a convenient degree of rotation by the beam during each closure. The back contact of the pulsing spring 1 is used to discharge the condenser 6.

Tube 50 has an axial cathode 8 surrounded by a set of cylindrically arranged control or accelerating electrode 9 between which and the cathode 8 a sufficient difference of potential exists due to source 12 to start electrons moving toward the anodes 14 to 18, etc., mounted around the circumference of the tube. When the contact 1 closes the circuit through coils 2A, 2B, 4A and 4B, the electrons are forced into a beam indicated at 13, impinging on anode 14. The beam immediately starts to rotate, sweeping over anodes 15, 16, etc. until contact 1 opens the circuit of the field coils and the beam dissipates.

With the anodes 15 to 18 of tube 50 is associated a set of gas-filled tubes 27 to 30, each having a control anode, an anode and a cathode. In tube 27, for example, the control anode 54 is connected through resistance 23 to the anode 15 of tube 50 and to ground through resistance 19. The cathode 55 of tube 27 is connected to positive battery and the anode 56 is connected to contact 49 of relay 40. The cathodes of tubes 28 to 30 are also connected to positive battery, while their control anodes are connected to resistance ground and to the anodes 16 to 18 of tube 50 in a manner similar to tube 27.

The connection of ground through resistances 19 and 23 to the control anode 54 of tube 27 maintains a bias on that electrode which prevents the tube 27 from operating. When the beam 13 of tube 50 strikes anode 15 the potential on the control anode 54 of tube 27 is made negative with respect to the cathode 55 and that tube strikes, setting up a current flow from positive battery through the tube 27 from cathode 55 to anode 56, normal contact 49 and winding of relay 40 to negative battery. Similarly if the beam impinges on anode 16 tube 28 will strike and if the beam impinges on anode 17 or 18 tube 29 or 30 will strike. Battery for tubes 28 to 30 is supplied over a contact of relay 40.

While anodes 16, 17 and 18 have been shown as consecutive in position, it will be understood that in practice they would be selected at such points that all pulses of the desired minimum length would cause the beam to reach anode 17 and that only pulses of more than the desired maximum duration would cause the beam to reach anode 18 with anode 16 located just ahead of anode 17. Anode 15 is so located that relay 40 will be operated for every pulse irrespective of its length.

In order that it may perform the necessary functions in the proper timed relationship, relay 40 could be a mercury contact relay of the type disclosed and claimed in U. S. Patent 2,295,602 granted to C. E. Pollard, September 15, 1942. With relays of this type, a single magnet coil may control any number of individual contacts each of which may be designed to operate as desired. Relay 40 therefore has six separate contact elements 44 to 49. Elements 44, 45 and 48 are arranged to close a contact quickly in response to the energization of the relay coil and have been marked 1 to indicate that they close first and substantially simultaneously. Contact elements 46 and 47 are arranged to make a short closure as the element operates similar to the function of the armatures shown but adjusted to occur after the time that tube 30 would break down in response to a long pulse. These elements are marked 2 to indicate that they function second. After an additional interval the element 49 (marked 3) opens its contact. All of the contact elements are arranged to return to normal quickly, as described in the above-identified Pollard patent.

The closure of contact 44 supplies battery to the anodes of tubes 28 to 30. Contact 48 controls a quick-acting counting mechanism 41 to count every pulse which operates relay 40. The opening of contact 49 quenches tube 27 and releases relay 40, to make it ready for the next pulse.

It would be possible to observe tubes 27 to 30 visually to note which tubes flash in response to individual pulses but for a continuous test some means of registering is required. For this purpose tubes 42 and 43 are provided.

Relay 40 by means of its contact 45 supplies operating potential to the tubes 42 and 43 through the windings of counting devices 52 and 53. At contact element 46 of relay 40 the control anode of tube 43 is momentarily connected to a point between resistances 35 and 36 which are in turn connected respectively to the anodes of tubes 28 and 29.

The circuits of tubes 28 and 29 are arranged in the form of a Wheatstone bridge, with the tubes in two arms, resistances 37 and 59 in the other two arms and resistances 35 and 36 in the bridge. If only tube 28 is discharging the bridge will be unbalanced and the current flow through resistances 35 and 36 is sufficient to overcome the bias applied to the control anode and to discharge tube 43. With tube 43 conducting a circuit is completed for counter 53 to indicate a short pulse.

If both tubes 28 and 29 are discharging, the bridge is substantially balanced and no current flows through resistances 35 and 36, whereby the potential applied to the tube 43 is insufficient to overcome the bias applied to the control anode of tube 43 and counter 53 is not operated. Therefore for any pulse of at least satisfactory length, no registration is made on counter 53.

Similarly contact element 47 connects the control anode of tube 42 to the anode of tube 30 so that if tube 30 is discharging tube 42 will break down and operate counter 52 to indicate a long pulse. It will be apparent, therefore, that counter 41 counts all pulses received, counter 53 counts all pulses which are shorter than the standard set up and counter 52 counts all pulses which are longer than that standard.

Counters 52 and 53, which may be of the type used for metering telephone calls, control auxiliary contacts which, when either counter has fully operated, connect ground to the associated tube to quench it and release the counter. It is obvious that any convenient type of counting mechanism might be employed.

The circuit of Fig. 4 may be employed to test the length of the open period of the pulsing contact 1 by reversing the connections to the back and front contacts of contact 1.

One source of the speed of this method of measuring pulses lies in the fact that the electric circuit whose current-time characteristics are used for the time measurement or "clock" is electrically quite divorced from the means used to "read" the clock. The magnitude of electron flow in the gas-filled tubes used to indicate the length of the pulse is not controlled by the measuring circuit; a normally constant flow of safe magnitude is previously set up and maintained. The magnetic field resulting from the current flow in the measuring circuit displaces the electron stream, with the displacement instantaneously controlled by measuring circuit currents, which are in turn proportional to elapsed time. By taking a signal from an electrode which the rotating beam contacts at a predetermined displacement, a quickly made limit reading is made, that is, a record that the elapsed time has equalled or exceeded the known time which it takes the beam to reach the displacement under the control of the measuring circuit.

Thus, this method of reading the instantaneous current, and hence time, in a condenser-resistance-inductance network by the displacement of an electronic beam electrically external to that circuit has three unique characteristics, viz., That the measuring circuit is made up of elements having highly stable, dependable and controllable values of capacity, resistance and inductance and is independent of interconnection with the circuit required for recording.

That the change of current in the measuring circuit is observed by displacement of the focussed electron beam in a vacuum tube by magnetic coupling, whereby the record is not dependent on quantitative flow or change of flow of electrons, but only on the magnetic coupling and the inertia characteristic of the beam.

That the record is already prepared and instantly recorded when the measured time is completed.

Fig. 5 shows an alternative means of recording the speed of a pulsing contact by the use of a high speed motion picture camera which simultaneously photographs the tube 61 together with the path of the beam 62 and the pulsing contact 63. This arrangement would be particularly valuable in observing pulses to an exact value of time rather than to acceptable limits.

What is claimed is:

1. Testing means for measuring the duration of pulses comprising a condenser, an electron beam tube having a pair of coils for rotating the electron beam, a circuit for simultaneously charging said condenser and energizing said coils in accordance with the charge received by said condenser in response to each pulse to produce a displacement of said beam proportional to the duration of each pulse, and means responsive to said beam during said displacement to register the extent of said displacement.

2. Pulse testing means comprising electron discharge apparatus having field magnets for generating a rotating electron beam, a circuit for generating a two-phase transient current in said field magnets in response to each pulse, and means operated in accordance with the rotation of said electron beam in response to said transient current to indicate the relative length of said pulses.

3. Testing means for measuring the duration of pulses comprising an electron beam tube, means for displacing the beam of said tube in accordance with the duration of each pulse, a plurality of anodes for said tube mounted in the path of said beam, said anodes so located as to mark the displacement of said beam produced by short pulses, satisfactory pulses and long pulses, respectively, a gas-filled tube connected to each of said anodes indicating the duration of pulses, registering means including a first means for counting the number of operations of said long pulse indicating tube, a second means for counting the number of operations of the short pulse indicating tube, and means under the control of the satisfactory pulse indicating tube to render said second counting means ineffective.

4. Testing means for measuring the duration of pulses comprising an electron beam tube, means for displacing the beam of said tube in accordance with the duration of each pulse, a plurality of anodes for said tube mounted in the path of said beam, said anodes so located as to mark the displacement of said beam produced by short pulses, satisfactory pulses and long pulses, respectively, a gas-filled tube connected to each of said anodes indicating the duration of pulses, registering means and means for connecting said registering means to said indicating tubes between pulses, said registering means including a first counting means for counting long pulses by counting the number of operations of said long pulse indicating tube, and a second counting means for counting short pulses, said second counting means so associated with said short pulse indicating tube and said satisfactory pulse indicating tube that said second counting means is rendered unresponsive if said satisfactory pulse indicating tube is operated.

5. Testing means for measuring the duration of pulses comprising an electron beam tube, means for displacing the beam of said tube in accordance with the duration of each pulse, a set of four anodes for said tube mounted in the path of said beam, one of said anodes being so located as to be in the path of any displacement of said beam, a second anode so located as to mark the displacement produced by a pulse of less than the minimum allowable duration, a third anode so located as to mark the displacement produced by a pulse of satisfactory duration and the fourth anode so located as to mark the displacement produced by a pulse of more than the maximum allowable duration, gas-filled tubes connected to said anodes and operative in response to the impingement of said beam on the associated anode to indicate the duration of a pulse, registering means, and means controlled by the gas-filled tube connected to said first anode to connect said registering means to the other gas-filled tubes to register pulses of unsatisfactory duration.

6. Testing means for measuring the duration of pulses comprising an electron beam tube, means for displacing the beam of said tube in accordance with the duration of each pulse, a set of four anodes for said tube mounted in the path of said beam, one of said anodes being so located as to be in the path of any displacement of said beam, a second anode so located as to mark the displacement produced by a pulse of less than the minimum allowable duration, a third anode so located as to mark the displacement produced by a pulse of satisfactory duration and the fourth anode so located as to mark the displacement produced by a pulse of more than the maximum allowable duration, gas-filled tubes connected to said anodes and operative in response to the impingement of said beam on the associated anode to indicate the duration of a pulse, registering means, a relay operative under the control of the gas-filled tube connected to said first anode, said relay effective in the interval between pulses to connect said registering means with the other gas-filled tubes to register pulses of unsatisfactory duration and to quench all of said gas-filled tubes.

7. Testing means for measuring the duration of pulses comprising an electron beam tube, means for displacing the beam of said tube in accordance with the duration of each pulse, a set of four anodes for said tube mounted in the path of said beam, one of said anodes being so located as to be in the path of any displacement of said beam, a second anode so located as to mark the displacement produced by a pulse of less than the minimum allowable duration, a third anode so located as to mark the displacement produced by a pulse of satisfactory duration and the fourth anode so located as to mark the displacement produced by a pulse of more than the maximum allowable duration, gas-filled tubes connected to said anodes and operative in response to the impingement of said beam on the associated anode to indicate the duration of a pulse, registering means, a relay operative under the control of the gas-filled tube connected to said first anode, said relay successively effective to prepare said duration indicating gas-filled tubes for operation, for connecting said registering means to said gas-filled tubes after the termination of a pulse and to restore all of said tubes.

8. Testing means for measuring the duration of a series of pulses comprising a condenser, an electron beam tube having a pair of coils for rotating the electron beam, a circuit for simultaneously charging said condenser and energizing said coils in accordance with the charge received by said condenser in response to each pulse to produce a displacement of said beam proportional to the duration of each pulse, means responsive to said beam during said displacement to indicate the extent of said displacement, and means operative between pulses to register said indication.

9. Pulse testing means comprising a condenser, means for charging said condenser in accordance with the duration of a pulse, electron discharge apparatus having field magnets for generating a rotating electron beam, a circuit for generating a two-phase transient current in said field magnets in accordance with the charge on said condenser to rotate said beam, and means operated in accordance with the extent of the rotation of said electron beam in response to said transient current to indicate the relative length of said pulse.

10. Testing means for measuring the duration of each of a series of pulses comprising a condenser, means for charging said condenser in response to each of said pulses, an electron beam tube having field magnets for generating a rotating electron beam, means for rotating the beam of said tube in accordance with the charge on said condenser, a plurality of anodes for said tube mounted in the path of said beam, said anodes so located as to mark the rotation of said beam by pulses of less than the minimum allowable duration, by pulses of satisfactory duration and by pulses of more than a maximum allowable duration, respectively, a plurality of gas-filled tubes connected with said anodes and operative in response to the impingement of said beam on the associated anode, and means under the control of said gas-filled tubes to register the number of pulses of unsatisfactory duration.

FRANK H. HIBBARD.

(References on following page)

REFERENCES CITED

The following references are of record in the file of this patent:

UNITED STATES PATENTS

| Number | Name | Date |
|---|---|---|
| 875,660 | Haig | Dec. 31, 1907 |
| 1,196,855 | Goodrum | Sept. 5, 1916 |
| 1,690,269 | Booth | Nov. 6, 1928 |
| 1,759,648 | Kunze | May 20, 1930 |
| 1,795,656 | Massonneau | Mar. 10, 1931 |
| 1,870,975 | Ulrey | Aug. 9, 1932 |
| 1,936,208 | Pitt | Nov. 21, 1933 |
| 2,015,570 | Sabbah et al. | Sept. 24, 1935 |
| 2,086,540 | Dimond | July 13, 1937 |
| 2,094,733 | Byrnes | Oct. 5, 1937 |
| 2,143,035 | Smith | Jan. 10, 1939 |
| 2,181,728 | Greentree | Nov. 28, 1939 |
| 2,186,268 | Pakala | Jan. 9, 1940 |
| 2,232,829 | Ross | Feb. 25, 1941 |
| 2,269,501 | Wiley | Jan. 13, 1942 |
| 2,342,016 | Schweitzer | Feb. 15, 1944 |
| 2,411,648 | Brauer et al. | Nov. 26, 1946 |
| 2,416,102 | Kessler et al. | Feb. 18, 1947 |

FOREIGN PATENTS

| Number | Country | Date |
|---|---|---|
| 87,118 | Sweden | Aug. 11, 1936 |